United States Patent
Hahn et al.

(10) Patent No.: US 7,858,889 B2
(45) Date of Patent: Dec. 28, 2010

(54) APPARATUS FOR PROCESSING MAIL ITEMS AND WEIGHING MODULE WITH SETTLING SECTION

(75) Inventors: Wilfried Hahn, Darmstadt (DE); Matthias Emanuel, Ober-Mörlen (DE)

(73) Assignee: Bowe Bell & Howell Company, Wheeling, IL (US)

( * ) Notice: Subject to any disclaimer, the term of this patent is extended or adjusted under 35 U.S.C. 154(b) by 235 days.

(21) Appl. No.: 12/212,312

(22) Filed: Sep. 17, 2008

(65) Prior Publication Data

US 2009/0071730 A1  Mar. 19, 2009

(51) Int. Cl.
*G01G 19/40* (2006.01)
*G01G 13/02* (2006.01)

(52) U.S. Cl. ..................... 177/145; 705/407
(58) Field of Classification Search ............. 177/25.15, 177/50, 145; 705/407
See application file for complete search history.

(56) References Cited

U.S. PATENT DOCUMENTS

| | | | |
|---|---|---|---|
| 3,901,797 A | | 8/1975 | Storace et al. |
| 4,223,751 A | * | 9/1980 | Ayers et al. ............. 177/210 C |
| 4,640,376 A | * | 2/1987 | Hinzpeter ................... 177/50 |
| 4,995,504 A | | 2/1991 | Kuhn |
| 5,750,938 A | * | 5/1998 | De Caris et al. ............. 177/50 |
| 5,856,637 A | * | 1/1999 | Vande Berg ................ 177/145 |
| 6,107,579 A | | 8/2000 | Kinnemann |
| 6,460,844 B1 | * | 10/2002 | Clifford et al. ............. 271/9.13 |
| RE38,233 E | * | 8/2003 | Vande Berg ................ 177/145 |
| 6,689,963 B2 | * | 2/2004 | Brook ......................... 177/145 |
| 7,601,923 B2 | * | 10/2009 | Lyga et al. ................ 177/25.15 |

FOREIGN PATENT DOCUMENTS

| | | |
|---|---|---|
| DE | 37 09 659 A1 | 10/1988 |
| DE | 3821 106 A1 | 1/1989 |
| DE | 196 04 090 A 1 | 8/1997 |
| EP | 0 881 956 B1 | 9/1998 |
| FR | 2 692 565 | 12/1993 |

OTHER PUBLICATIONS

European Search Report issued in European Patent Application No. EP 08 15 7611, mailed Dec. 8, 2008.
"WayMark™: Enhance your Criterion® Based Operations with the Latest upgrade from Bowe Bell+Howell!" pp. 1-2 Bowe Bell+Howell 2006.

* cited by examiner

*Primary Examiner*—Randy W Gibson
(74) *Attorney, Agent, or Firm*—McDermott Will & Emery LLP

(57) ABSTRACT

An apparatus is provided for processing mail items transported in a stream on a transport section. The apparatus includes a weighing system which is accessible via the transport section. The weighing system includes a distributor device which divides the stream of mail items into two paths, the paths being joined together again by way of a combining device. A weighing section is provided in the first of the two paths for the automatic weight determination of the mail items, and the second path is configured to bypass the weighing section, with no weighing taking place in the bypass. In other embodiments, a calming/settling section is provided immediately prior to or after the weighing section. The mail items are transported in a clamped manner on one edge over the weighing section, whereas in the settling section, the mail items are transported on one edge while leaning against one of the lateral guide belts.

21 Claims, 3 Drawing Sheets

ABSTRACT# APPARATUS FOR PROCESSING MAIL ITEMS AND WEIGHING MODULE WITH SETTLING SECTION

RELATED APPLICATIONS

This application claims the benefit of German Patent Application No. DE 10 2007 044 419.4, filed on Sep. 17, 2007 and German Patent Application No. DE 10 2007 044 746.0, filed on Sep. 18, 2007, the disclosures of which also are entirely incorporated herein by reference.

TECHNICAL FIELD

The present subject matter relates to an apparatus for processing items of mail, in particular flat items of mail such as letters, which are transported in a stream of items (item stream) on a transport section, the apparatus comprising a weighing device which is accessible via the transport section, the weighing device having a distributor device which apportions the stream of the items of mail to part paths, the part paths being gathered together again after weighing items of mail in the further course via a uniting device. The present subject matter likewise relates to a weighing module for use in an apparatus of this type.

The present subject matter further relates to an apparatus for weighing items of mail, in particular flat letters, which are transported in an item stream on a transport section, a weighing device having a feed section, a weighing section which is equipped with scales, and a discharge section being provided in the transport section, the weighing section being decoupled mechanically from the feed section and the discharge section, driven guide belts being provided, between which the items of mail are transported in a clamped manner, the weighing section having separate guide belts which are situated in the reference system of the scales. The inclusion of a settling or calming section before and or after the weighing section to stabilize the flat items to reduce impulses to the weighing device.

BACKGROUND

With some prior art devices, letters of different formats and postcards are processed in a continuous item stream. In order to determine the postage or fees necessary for the processing, the weight of the individual items of mail is determined. The items of mail being guided over a weighing device for this purpose. Here, the item stream may not be retarded discernibly or even stopped. It is to be ensured in currently running systems that the weighing operation is carried out reliably despite high item streams of up to 50,000 items of mail per hour. The scales which have been used previously in the weighing devices are restricted in principle in their weighing frequency, however, since they first have to settle on the weighing device before they can weigh a new item of mail precisely. In addition, the apparatuses are also to be designed in such a way that the items of mail are not damaged at belt speeds of more than two meters per second. DE 196 04 090 A1 has disclosed an apparatus of the foregoing type for the automatic weight determination of items of mail, in which apparatus the transport section is apportioned at a distributor device into two or more parallel weighing sections, a set of scales being provided in each of the weighing sections, with the result that each set of scales has to manage only the corresponding part of the amount of items of mail. In this way, weighing operations can be performed with great precision on a continuous item stream at high speed. As a result of the fact that, for example, only every second item of mail from the input item stream has to be weighed by each set of scales, therefore the individual set of scales has more time to settle again after removal of the item of mail and to prepare itself for the next weighing operation. Here, the connection of the drives which is disclosed, in particular, in DE 196 04 090 A1 ensures that a displacement of the relative position of the items of mail with respect to one another in the item stream is avoided.

It is then one object of subject matter disclosed herein to optimize an apparatus with regard to its installation space and its flexibility, without impairing the precision of the weighing operations at high speed and density of the item stream. In addition, it is an object of subject matter disclosed herein to provide a weighing module which, with a particularly simple construction, makes it possible to extend the processing apparatuses for the purpose of a further increase in the throughput. There is a need to have independent weighing devices with a bypass means that are modular in design for placement at various locations in the mail transport path.

With other prior art devices, items of mail and, in particular, flat letters of different formats and postcards are processed in a continuous item stream. In order to determine the necessary postage or fees for the processing, the weight of the individual items of mail is determined, the items of mail being guided for this purpose via a weighing device. Here, the item stream must not be retarded appreciably or even stopped. Systems which are currently used can carry out weighing reliably at high item streams of up to 50,000 items of mail per hour. The scales which were previously used in the weighing devices are limited in their weighing frequency in principle, however, because they have to settle before they can weigh a new item of mail precisely. In addition, a certain overall length of the scales is necessary, in order to have the letter which is to be weighed on the scales for long enough and for it to be possible to carry out an accurate measurement. Finally, the measurement has to be finished in the known apparatuses before the letter is gripped by the guide belts of the discharge path which lead it away and the reference system of the scales is coupled to that of the surroundings.

It is therefore an object subject matter disclosed herein to provide an improved, technically simple means with regard to the precision of the weighing operations despite a high speed and density of the item stream.

SUMMARY

It desirable to provide an apparatus for processing mail items transported in a stream on a transport path. The apparatus includes a weighing system accessible by way of the transport path. The weighing system includes a distributor device which separates the stream of the mail items in the transport path into first and second paths, a weighing section for automatic weight determination of the mail items included in the first path, wherein the second path is a bypass which bypasses the weighing section and no weighing operation occurs in the bypass. A combining device is provided for combining the first and second paths downstream from the first weighing section.

It further desirable to provide an apparatus for processing mail items transported in a stream on a transport path. The apparatus includes a plurality of detachable weighing modules accessible by way of the transport path. Each weighing module includes a distributor device which separates the stream of the mail items in the transport path into first and second paths and a weighing section for automatic weight determination of the mail items in the first path, wherein the second path is configured as a bypass, which bypasses the weighing section, and no weighing operation occurs in the bypass. A combining device is provided for combining the first and second paths downstream from the weighing section.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation.

DETAILED DESCRIPTION

Figure 1:
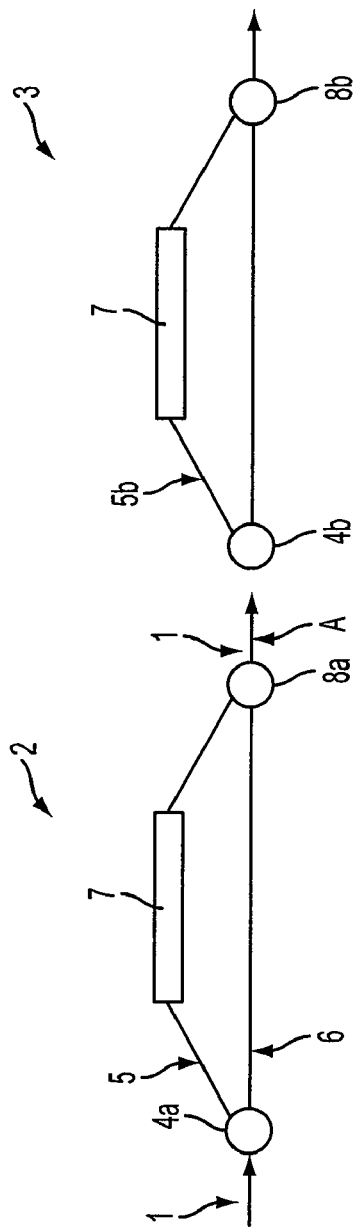
FIG. 1 depicts an apparatus for processing items of mail having two weighing devices which are arranged behind one another, having bypasses which run in a straight line.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

One particular inventive concept lies first of all in apportioning the stream of items into two part paths which are to be assigned to a weighing device, only one of these part paths being equipped according to the present subject matter with a set of scales and being denoted as a weighing section in the following text, while the other part path is configured as a pure bypass. Here, being "equipped" with a set of scales means that the item of mail is guided over a set of scales on this part path, it being possible for the scales which are known from the prior art to serve as scales. In contrast, the bypass is routed past the scales, optionally also over or below it, without a weighing operation taking place. The items of mail which are guided over the first part path are therefore weighed, while those which are guided over the bypass remain unweighed, at least initially. The unweighed items of mail which are fed to the item stream again after the weighing section can be treated as desired. However, they are preferably later likewise fed to a weighing device, in particular of this type, which is equipped with a set of scales and a bypass. Accordingly, the items of mail which have already been weighed can then be guided past the second set of scales via a bypass.

In conjunction with this application, the term "weighing device" denotes a part of an apparatus for processing items of mail, which part has at least two parallel part paths, one of the part paths being equipped with a set of scales as weighing section in accordance with the present subject matter, while the other part path forms the bypass.

As is known from the prior art, the items of mail, in particular the letters, are advantageously clamped between driven guide belts and moved over the transport section in an upright manner on one edge. Clamped in this way, they can also be guided over a set of scales, it being necessary for the clamping to take place on the scales in the reference system of the scales, in order not to falsify the weighing operation. To this end, a dedicated guide with drive is provided on the scales. The guide belts are driven in each case via drive rolls which are to be controlled independently to a greater or lesser extent depending on the requirements.

The particular advantage of this weighing device according to the present subject matter lies firstly in the fact that it can be constructed with a comparatively small width, since only a narrow bypass and no second set of scales has to be guided past the wide scales. This space advantage plays a considerable role in the case of the relatively narrow apparatuses over their entire length for processing items of mail, since the accessibility of the individual sections is thus improved for the staff and the space requirement is reduced in width terms. The use of the weighing device according to the present subject matter therefore contributes to an "ergonomic" and "economical" design of the overall apparatus.

A further notable advantage lies in the fact that, depending on the throughput which is to be expected, the overall apparatus can be equipped, without special design measures, with a plurality of weighing devices of this type which are to be connected behind one another. In this case, a second distributor device which once again apportions the stream of the items of mail to a weighing section having a second set of scales and to a second bypass is situated in the transport section behind the uniting device in the stream direction. The same is also true for further weighing devices. In this way, item streams of virtually any speed and density can be processed in principle. An increase of the flows of over 50,000 items of mail per hour with speeds of more than 2 m/sec is possible without problems by the connection one behind another of a plurality of weighing devices of this type which are provided with a bypass. With a throughput of this type, the weighing device is certainly no longer the "bottleneck" which impedes the item stream.

In this context, it is particularly advantageous if the weighing device is configured as a weighing module which can be used flexibly and can be connected together with other units. This weighing module is distinguished by a compatible "interface", at which the item stream can be transferred to the weighing module from a unit which lies in front of it in the stream. After the interface which to a certain extent forms the entrance to the weighing module, a first part path branches off from the transport section, which first part path leads via a set of scales to the automatic weight determination of the items of mail. A second part path leads past the scales as bypass. The compatible interface is realized via the arrangement of the guide belts, which arrangement makes it possible to connect two identical weighing modules behind one another. Here, control means are to be provided for actuating the distributor devices, in order to detect the items of mail which have been weighed by means of the first weighing device and to feed them to the second bypass or vice versa.

In order to achieve a situation where the stream of items of mail which passes over bypasses which are connected behind one another is as continuous as possible, it is advantageous if the part path which is provided with the scales is diverted laterally from the transport section which runs straight ahead, while the bypass is routed further straight ahead. An individual item of mail can therefore be guided over bypasses past a plurality of weighing devices without being diverted out of the rectilinear transport section, before the said item of mail is ultimately weighed in a part path which branches off.

In contrast, it can be advantageous, in particular if weighing modules are used which are arranged behind one another, to provide the scales in a straight part path, in order not to complicate the weighing operation with the temporarily somewhat higher speed which would be necessary over the longer part path. In this embodiment, the bypass forms the part path which bypasses the scales and is therefore longer, but is not sensitive to an increase in speed. Here, the bypass can be controlled independently of the part path which is equipped with the scales. In the case of a modular construction, it is advantageous in this design if the modules which are arranged behind one another are arranged "mirror-symmetrically", that is to say the bypass is first of all guided to the right around the weighing section, while it is guided around to the left in the case of the following module. In this way, a critical V-shaped bend is avoided in the guidance of the items of mail, which bend can occur at the interface, if it leads from the uniting device of the first weighing module directly into the distributor device of the next weighing module. This arrangement of weighing modules leads to a reduction of the overall length, since relatively long straight transport sections can be dispensed with at the ends of the weighing modules.

In another embodiment, it can be advantageous to make the weighing section and the bypass equally long, in order to make it possible to drive both sections in a unified manner. However, in comparison with the above-described constructions, this construction leads to a slight widening of the entire apparatus, the overall width still being smaller than the two scales which are arranged next to one another.

Figure 4:
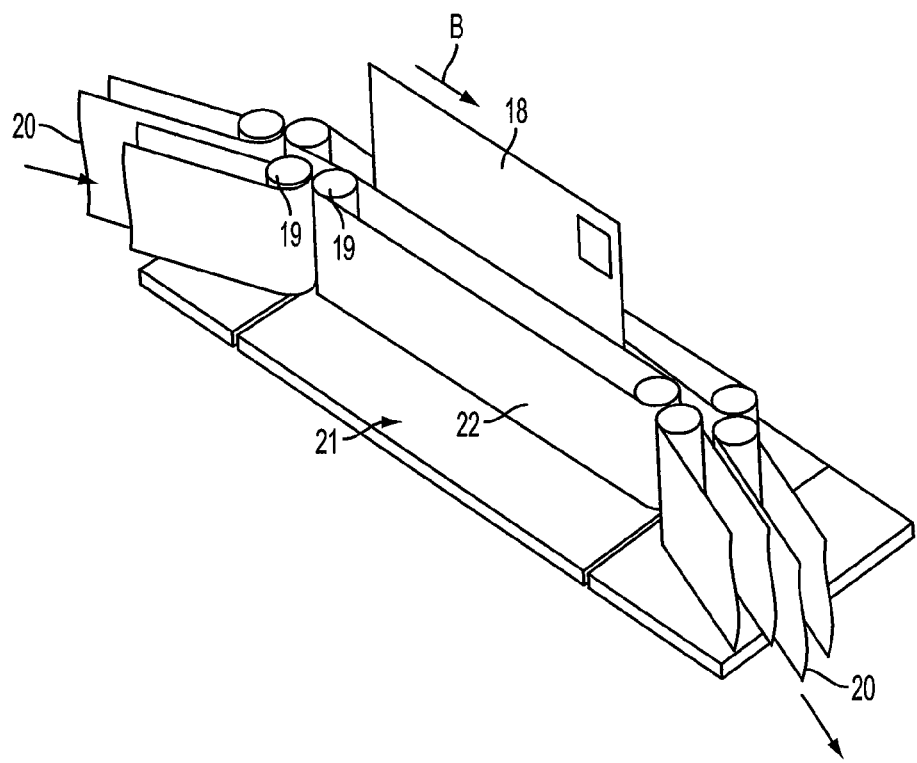
FIG. 4 depicts a set of scales.

In a diagrammatic manner, FIG. 1 shows a part of an apparatus for processing items of mail, such as letters, which are transported in an item stream on a transport path 1. The apparatus which is shown comprises two weighing devices 2 and 3 which are accessible via the transport path 1 and begin in each case at a distributor device 4. The distributor device 4a, 4b distributes the item stream to two part paths 5 and 6, a set of scales 7 being provided in a first of the part paths 5 for automatic weight determination of the items of mail. The second part path 6 is configured as a bypass which bypasses the scales 7. No weighing operation takes place in the bypass 6. After the weighing operation, the part paths are guided together again via a combining device 8a in the common transport path 1. The letters, in particular, can be guided, as shown in FIG. 4, by guide belts, by way of which the said letters are transported on the transport path such that they stand on one edge.

In this case, the part path 5 which is provided with the scales 7 is diverted laterally out of the transport path 1 which runs in a straight line, while the bypass 6 leads further straight ahead. Accordingly, this weighing section 5 is somewhat longer than the bypass 6, with the result that the speed has to be increased correspondingly, in order to reintroduce the item of mail into the item stream in its old position at the combining device 8. The combining device 8 is therefore designed in such a way that it brakes the somewhat higher speed in the weighing section to the level of the original speed. An alternative to having a speed difference between paths 5 and 6 is to adjust the gap between items of mail is adjusted when fed into the transport path 1 to accommodate the reduced gap that occurs when the first two items of mail are combined 8a. The gap change is corrected after the items of mail are processed by the second weighing device 7 and combined at point 8b. The increase in gap may reduce the overall device throughput.

After the weighed items of mail have been reunited with the stream of the unweighed items of mail at the combining device 8, they arrive at the second distributor device 4b, where the previously unweighed items of mail are decoupled and are guided over the weighing section 5b. The second distributor device 4b is therefore situated in the transport path in the stream direction (arrow A) behind the combining device 8a, which second distributor device 4b once again divides the stream of the items of mail into a part path 5b having a second set of scales and into a second bypass 6b.

Figure 2:
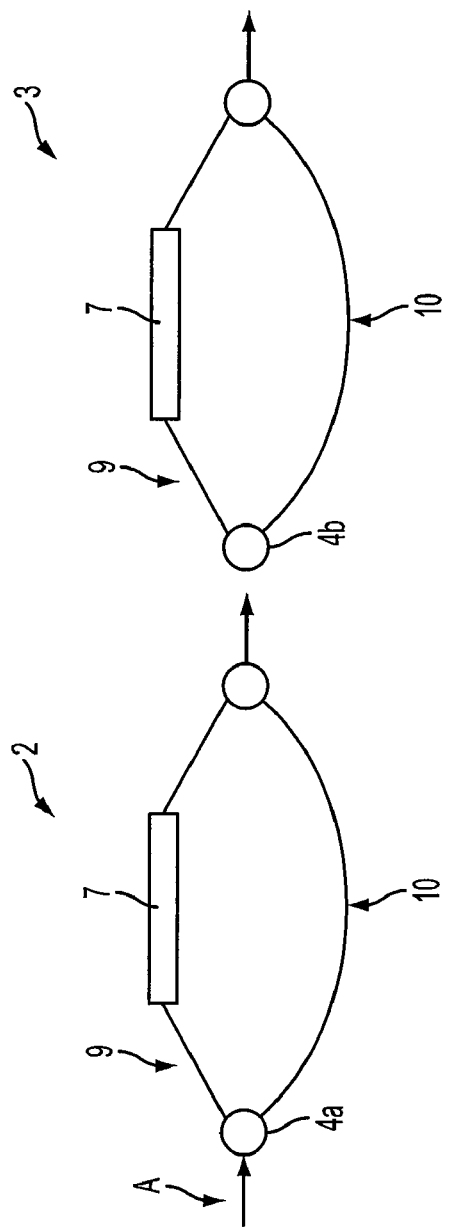
FIG. 2 depicts an apparatus of this type having two weighing devices which are arranged behind one another and have equally long part paths.

FIG. 2 shows a diagram which equates in principle to that shown in FIG. 1. In this case, however, the bypass 10 and the weighing section 9 which is provided with the scales have the same length, with the result that both paths can be controlled via a coupled drive. In order to realize the length of the weighing section, the bypass 10 is guided in an arc.

There are control means (not shown) for actuating the distributor devices 4a and 4b, in order to move the items of mail onto the right path and, in particular, in order to feed the items of mail which are weighed by means of the first weighing device to the second bypass.

Figure 3:
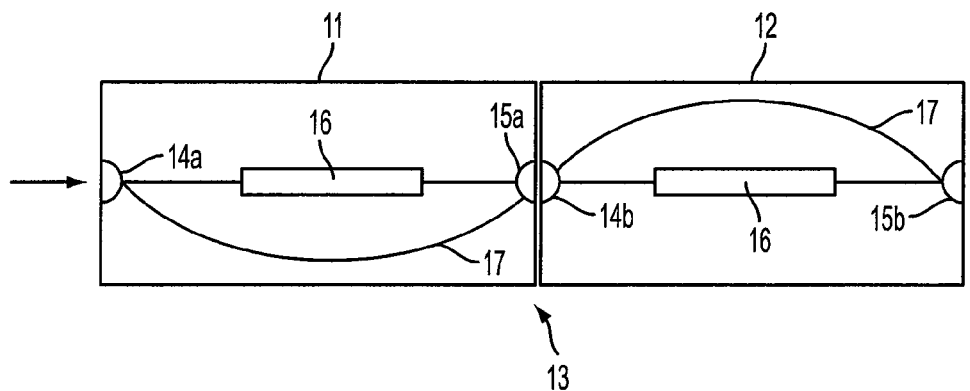
FIG. 3 depicts two weighing modules which are arranged behind one another.

The diagrams which are shown in FIGS. 1 and 2 can also be realized by two modules which are connected behind one another. FIG. 3 shows a sequence of two modules which are identical but are arranged mirror-symmetrically, the modules 11 and 12 being indicated by rectangles which are coupled via an interface 13. The interface 13 ensures firstly the mechanical coupling, but it also couples the guides. To this end, the distributor devices 14a and 14b and the combining devices 15a and 15b are configured in this case in such a way that they abut one another directly. A distributor device, at the direct end of which the combining device is arranged, is therefore situated directly at the beginning of the transport section which is realized on the weighing module. The start and the end of the modules could also be realized with a piece of straight transport path, but installed length can be saved in the way shown in FIG. 3.

As can be seen, the weighing modules 11 and 12 also have a part path with a set of scales 16 for automatic weight determination of the items of mail, and a second part path which guides past the scales 16 as a bypass 17. The arrangement of the guide belts makes it possible for the two identical weighing modules to be connected behind one another. In the example which is shown, the bypass 17 is diverted out of the transport path, while the part path which is provided with a set of scales 16 leads further straight ahead. As described above, the modules are arranged mirror-symmetrically, the base plate being identical and being arranged such that it is rotated by 180°. In this way, one item of mail can be guided as it were rectilinearly from bypass to bypass, without a kink occurring in the guide section. Transport paths (5, 6); (9, 10) and (16, 17) do not require that they have a common drive source or have their systems rigidly coupled to achieve proper operation. With these designs, normal speed variations do not result in gap reductions that will contribute to increased jams for the items of mail in subsequent sections of the processing system.

FIG. 4 shows the principle of the guidance over the transport paths by means of guide belts, which realize a sandwich belt system, in which a letter 18 is clamped between two guide belts 20 which run over drive rolls 19. Here, FIG. 4 shows the transition to a set of scales which is arranged under the plate 21. The guidance on the scales takes place between a pair of separate guide belts 22 which are held on the plate 21 and therefore in the reference system of the scales. Exact weighing of the letter is therefore possible. The movement direction is indicated by the arrow B. Since the scales do not function in both movement directions, it is advantageous to design the said scales in such a way that they can be rotated readily by 180°.

Figure 5:
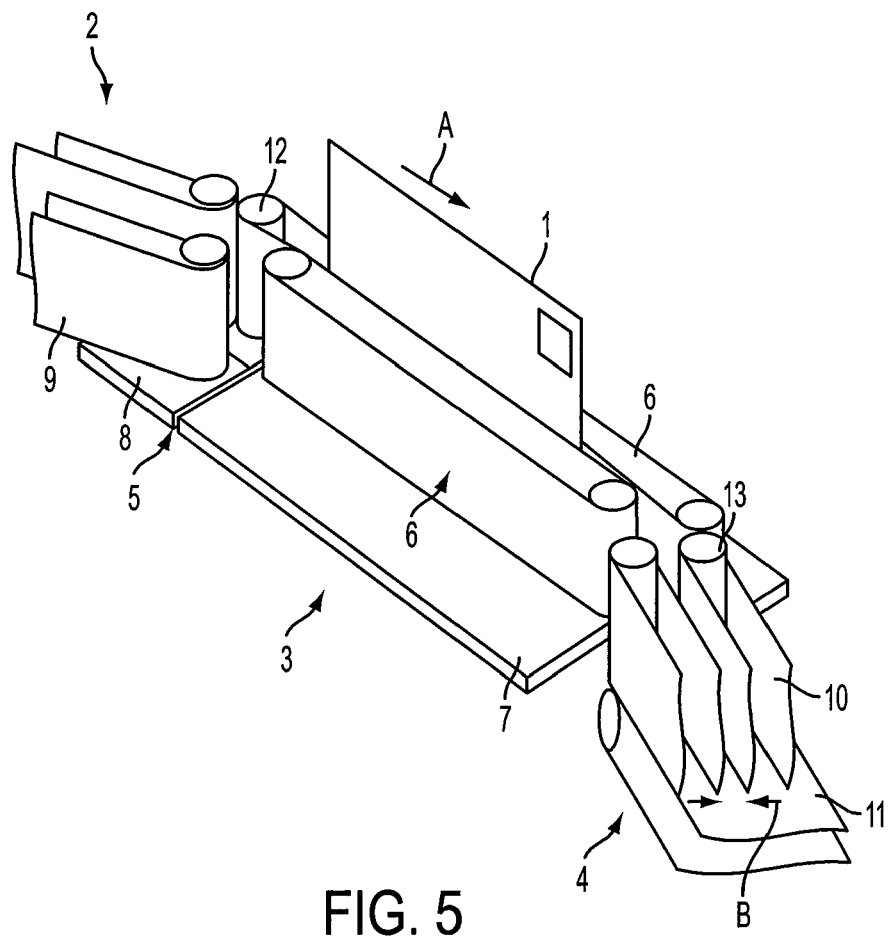
FIG. 5 depicts a set of scales having a settling/calming section connected in front of it and behind it.
Figure 6:
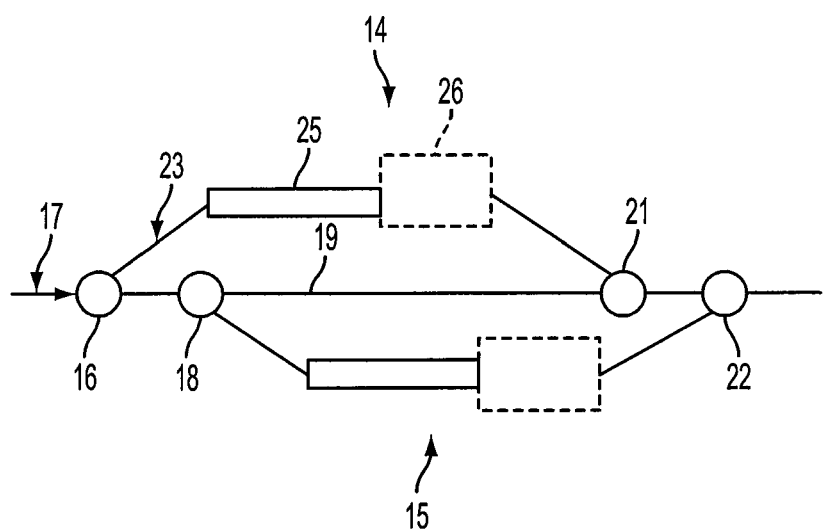
FIG. 6 depicts a diagram of weighing sections which are arranged in parallel.

Reference is now directed to FIGS. 5 and 6 of another embodiment of the present subject matter.

An embodiment of the present application provides for a calming/settling zone which adjoins the weighing section. In this calming zone, the item of mail is transported in an ungripped manner and can settle before or after the weighing operation which takes place on the item of mail which is guided in a clamped manner. Coupling of the reference systems takes place only when the item of mail has settled. This coupling is comparatively "soft" and can be taken into consideration without problems in the arithmetic evaluation of the weighing operation. In contrast to this, the previously known systems which immediately grip the letter which emerges from the scales in a clamping manner again, in order to ensure permanent gripping, bring about a sudden "hard" coupling of the reference systems via the letter which is gripped on both sides. This pulse which can be seen clearly in the measured data makes the evaluation of the measurement of the measured data susceptible to errors and leads to the scales not being calmed quickly enough after the letter has been discharged, the calming being necessary for the subsequent measurement. The present subject matter therefore contributes to a minimization of the force flow between the scales and the adjacent components.

Here, the weighing operation is advantageously performed by way of scales which function on the basis of a force/distance compensation. In scales of this type, the pad of the scales moves about the zero point at most in the micrometer range despite the item of mail which acts with gravity, with the result that the said pad can be denoted as virtually rigid. A letter which moves into the scales or out from the scales therefore does not change its horizontal position. In these scales which do not form a "step" to the preceding and subsequent transport section by way of their weighing surface, the calming zones according to the present subject matter which are advantageously configured as calming modules which can be inserted flexibly into the transport path can be used particularly well.

A further advantage of the calming zone or the calming module is that, equipped with a dedicated independent drive, it can be used as desired in front of or behind the scales as buffer or as acceleration section. If, for example, the speed on the scales had to be reduced somewhat in order to complete the weighing operation, the belt speed in the calming zone can be increased accordingly, in order to re-establish the original spacing of the items of mail. In these cases, the advantage of non-gripped guidance in the calming zone also lies in the fact that the letter which comes from the scales is simply positioned onto a belt which is running somewhat more quickly and is not torn from the scales by a covering belt system which is running at a higher speed. The same is also true of the "soft" transition from the calming zone to the scales. The scales can collect the letter to a certain extent from the calming zone. In general, the calming zone is tolerant of different speeds on account of the non-gripped guidance of the letters.

It is particularly advantageous here if, for transporting the item of mail, the calming zone has an underfloor drive, onto which the transported item of mail can be placed. The lateral guidance in this underfloor drive can be carried out by lateral guide plates, against which a flat letter which is transported on its edge can bear and along which it can slide. Since sliding is associated with friction which brakes and acts on the letter, it is advantageous if the lateral guide plates are replaced by at least one lateral guide belt which is driven at the speed of the underfloor drive and against which a flat item of mail can bear which stands upright with one edge on the underfloor drive. Here, tilting of the letter to the side of the guide belt can be provoked by an inclination of the underfloor drive. It is particularly advantageous to provide guide belts on both sides of the underfloor drive, with the result that the letter can tilt to both sides.

In order to obtain as long a weighing duration as possible, it is advantageous to delay the coupling to the calming zone via the letter which comes into contact with it. This is possible if, in the case of the calming zone which is arranged behind the scales, its level lies a little, in particular less than 1 millimeter, below the level of the weighing section. In this case, the item of mail which leaves the weighing section hangs with its start in the air for a while, until it tilts onto the calming zone. In this way, the measurement duration is somewhat longer and the coupling during the transition is even softer, which has a positive effect on the weighed result. It will be the case in practice that a covering belt system having two guide belts which permanently grip the letters adjoins in front of and behind the calming zone in the stream direction, with the result that the relative position of the items of mail within the stream is maintained reliably.

In order to obtain as high as possible a throughput of items of mail of over 20,000 items per hour, it is advantageous to provide two parallel weighing devices with in each case separate feed sections, in each case one weighing section which is equipped with scales, and in each case one discharge section. A distributor device is then to be introduced into the transport section in front of the weighing devices in the flow direction, by way of which the items of mail are diverted to one or the other feed section, with the result that the items of mail are apportioned to the weighing devices. In the case of two parallel weighing devices, the distributor device can apportion the items of mail alternately to the two weighing devices. A corresponding uniting apparatus is to be provided behind the weighing devices, by way of which uniting apparatus the part streams which are guided via the individual weighing devices are gathered together again. It is advantageously to be ensured during gathering that the original spacing of the individual items of mail in the stream is maintained. The setting up of calming zones is advantageous precisely for this purpose, it being possible for any displacements to be compensated for by way of the individually actuable drives of the said calming zones.

In another advantageous embodiment, two weighing devices are not connected in parallel, but rather one set of scales is equipped with a bypass which bypasses the weighing devices, no weighing of the item of mail taking place in the bypass. It is possible to increase the flexibility of the overall apparatus with a smaller overall width by way of a plurality of scales which are arranged one behind another in the transport section and are equipped with a bypass. The buffering character of the calming sections according to the present subject matter also has a particularly advantageous effect in this embodiment. A combination of these two embodiments is also possible.

In certain embodiments, it is particularly advantageous with regard to the flexibility if the calming zones are configured as calming modules which have in each case an underfloor drive with flanking side belts, the underfloor drive and side belts being operated at the same speed and the spacing of the side belts being greater than the greatest thickness to be expected of the item of mail, in particular of the letter, with the result that permanently gripped guidance of the letter does not occur. Care should be taken to ensure the mechanical compatibility of the components during the design of modules of this type.

FIG. 5 depicts an apparatus for weighing letters 1 which are transported on a transport section in an item stream which runs in the arrow direction A. A weighing device which has a feed section 2, a weighing section 3 which is configured as a set of scales, and a discharge section 4 is incorporated into the transport section. As can be seen at the slots 5, the weighing section 3 is decoupled mechanically from the feed section 2 and the discharge section 4. In front of the feed section 2 and behind the discharge section 4, the transport section has driven guide belts in the manner of a sandwich belt system, between which the letters are transported in a secure gripped manner. Guide belts 6 which are combined to form a sandwich belt system of this type are shown in the figure only on the weighing section 3, the said guide belts being driven via drive rolls 12. The set of scales which belongs to the weighing section 3 has a force/distance compensation means, with the result that the scales support 7 remains in one plane with the support 8 of the feed section 2.

According to the present subject matter, in each case one calming zone is provided in the feed section 2 in front of the weighing section 3 and in the discharge section 4 behind the weighing section 3, in which calming zone the letter is guided without lateral clamping. It can thus be seen that the spacing B between the guide belts 9 and 10 is considerably greater than between the guide belts 6. The guide belts 9 and 10 are likewise driven via drive rolls 13. In order to transport the letter 1, the calming zone has an underfloor drive 11, onto which the letter is deposited after it has left the weighing section 3. Standing with its edge on the underfloor drive 11, the letter 1 tilts against the left hand or right hand one of the guide belts 10 which run at the same speed as the underfloor drive 11.

FIG. 6 shows a diagram of weighing sections 14 and 15 which are arranged in parallel. The weighing devices 14 and 15 branch off from the transport section 17 at the distributor devices 16 and 18 which are configured as diverters. A bypass 19 bypasses both weighing devices, combining devices 21 and 22 guiding the part streams together again.

The weighing devices 14 and 15 have a feed section 23, a weighing section which is equipped with a set of scales 25, and a discharge section 26, the weighing section being decoupled mechanically from the feed section 23 and the discharge section 26. A calming zone according to the present subject matter is provided immediately behind each weighing section which is equipped with a set of scales 25.

In the previous description, numerous specific details are set forth, such as specific materials, structures, processes, etc., in order to provide a better understanding of the present subject matter. However, the present subject matter can be practiced without resorting to the details specifically set forth herein. In other instances, well-known processing techniques and structures have not been described in order not to unnecessarily obscure the present subject matter.

Only the preferred embodiments of the present subject matter and but a few examples of its versatility are shown and described in the present disclosure. It is to be understood that the present subject matter is capable of use in various other combinations and environments and is susceptible of changes and/or modifications within the scope of the inventive concept as expressed herein. It is intended by the following claims to claim any and all applications, modifications and variations that fall within the true scope of the present teachings.

The invention claimed is:

1. An apparatus for processing mail items transported in a stream on a transport path, the apparatus comprising:
a weighing system accessible by way of the transport path, the weighing system including:
a distributor device which separates the stream of the mail items in the transport path into first and second paths, a first weighing section for automatic weight determination of the mail items included in the first path, wherein
the second path is configured as a bypass which bypasses the weighing section, and no weighing operation occurs in the bypass; and
a combining device for combining the first and second paths downstream from the first weighing section.

2. The apparatus according to claim 1, wherein the first path diverts laterally out of the transport path which runs in a substantially straight line, while the second path runs substantially parallel with the transport path.

3. The apparatus according to claim 1 or 2, wherein the first and second paths have substantially the same length.

4. The apparatus according to claim 1 or 2, wherein the transport path includes guide belts to transport the mail items in an upright position on one edge.

5. The apparatus according to claim 1 or 2, further comprising:
a second distributor device positioned in the transport path downstream from the combining device, the second distributor device configured to divide the stream of mail items into a third path and a fourth path; and
a second weighing section included in the third path, the fourth path being configured as a bypass of the second weighing section.

6. The apparatus according to claim 5, further comprising a controller for actuating:
the first distributor device to feed first mail items to the first weighing section and second mail items to the second path;
the second distributor to feed the second mail items to the second weighing section and the first items to the fourth path.

7. The apparatus according to claim 4, wherein the guide belts are driven by drives and the mail items are moved along the transport path and the first and second paths, the mail items sandwiched between opposing guide belts in an upright position on one edge.

8. The apparatus according to claim 1, wherein drives for the first and second transport paths are not rigidly coupled.

9. An apparatus for processing mail items transported in a stream on a transport path, the apparatus comprising:
a plurality of weighing modules mechanically coupled via an interface accessible by way of the transport path, each weighing module including:
a distributor device which separates the stream of the mail items in the transport path into first and second paths, a weighing section for automatic weight determination of the mail items in the first path, wherein the second path is configured as a bypass which bypasses the weighing section and no weighing operation occurs in the bypass; and
a combining device for combining the first and second paths downstream from the weighing section.

10. The apparatus according to claim 9, wherein the distributor device is positioned upstream of the combining device with the weighing section positioned between the distributor and combining devices.

11. The apparatus to claim 10, wherein the second path diverts out of the transport path which runs in a substantially straight line, while the first path runs substantially parallel with the transport path.

12. The apparatus according to claim 11, wherein the weighing section is positioned below a base plate and the weighing section is rotatable by 180°.

13. The apparatus according to claim 1, wherein
the weighing section is mechanically decoupled from feed and discharge sections, driven guide belts are provided for transporting the mail items in a clamped manner over the weighing section, the apparatus further comprises a settling section provided immediately upstream or downstream of the weighing section and the mail items are transported in the settling section without lateral clamping.

14. The apparatus according to one of claim 13, wherein the settling section includes an underfloor drive onto which the mail items are transported.

15. The apparatus according to claim 14, wherein:
the settling section comprises a lateral guide belt, against which the mail items leans against while standing on one edge on the underfloor drive and the lateral guide belt is driven at a speed of the underfloor drive.

16. The apparatus according to claim 13, wherein the settling section is arranged downstream from the weighing section, at a level below that of the weighing section, such that the mail items exit the weighing section partially in air for a period of time.

17. The apparatus according to claim 13, wherein the mail items are transported in a clamped manner over the weighing section.

18. The apparatus according to claim 13, wherein the settling section is positioned upstream of the weighing section.

19. The apparatus according to claim 9, further comprising:
at least one settling section provided immediately upstream or downstream of the weighing section, wherein the mail items are transported in the settling section without lateral clamping.

20. The apparatus according to claim 9, wherein settling sections are provided upstream and downstream of the weighing section.

21. The apparatus according to claim 9, wherein the weighing modules are in-line or parallel to one another.

* * * * *